United States Patent Office 3,228,001
Patented Jan. 4, 1966

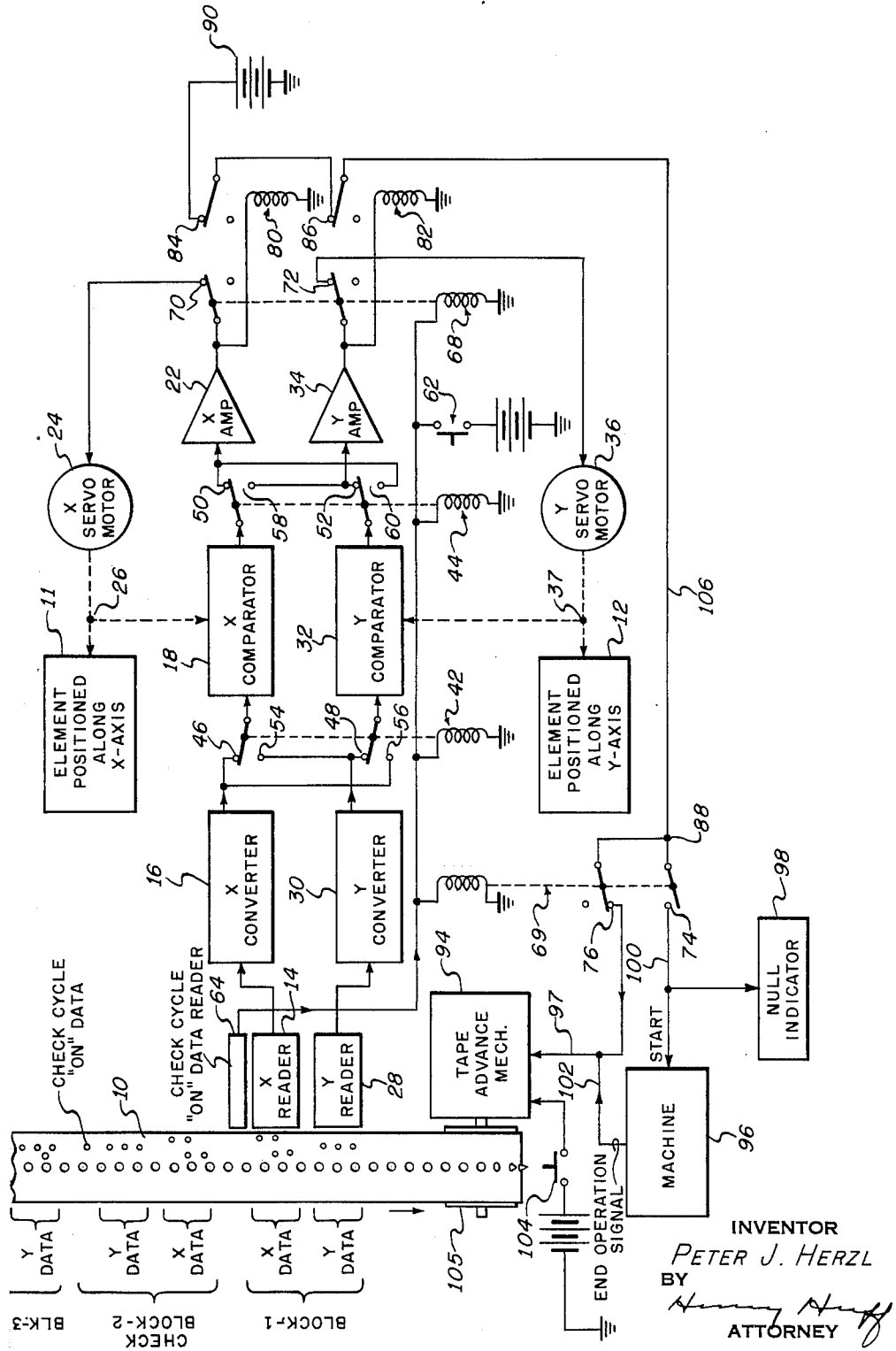

3,228,001
REDUNDANT INPUT RELIABILITY CHECK FOR PROGRAMMED MULTI-CHANNEL POSITION CONTROL
Peter Joseph Herzl, Montreal, Quebec, Canada, assignor to Sperry Gyroscope Company of Canada, Ltd., Montreal, Quebec, Canada
Filed June 7, 1960, Ser. No. 34,445
Claims priority, application Canada, Feb. 4, 1960, 791,901
5 Claims. (Cl. 340—149)

This invention relates to a method and apparatus for checking the reliability of a multi-channel program controlled system for controlling measure such as position, temperature, flow, or other measure.

One of the main problems in programmed tool control is the possibility of a malfunction of the control, resulting in expensive scrap, costly delay, and loss of confidence in the control. Methods and apparatus heretofore proposed for making reliability or error checks have generally covered only partial checks, checking only certain portions of the system, and usually involving an extensive amount of additional apparatus.

By means of the present invention, a substantially complete check is made in a multi-channel program controlled system by utilizing duplicate circuits available in the separate channels to check one another.

In accordance with one embodiment of the invention, recorded commands for position involving two axes, for example X and Y axes, are normally read and translated by respective X and Y channels in which X and Y position servos are driven to X and Y end positions. These end positions are then checked by rearranging the connections between the structural elements utilized in the X and Y channels by suitable switching, and then repeating the X and Y commands in transposed order to the system, i.e., the X command being read by the Y reader and the Y command by the X reader. In this manner, the repeated command for each axis is read by a different reader and completely different circuitry. If the error signals generated by the X and Y servos change as a result of the switching, a malfunction in the circuit is indicated. The malfunction may be indicated in any suitable manner, for example, visually as by lights, or by suitable go-ahead or stop signals to the system.

It is therefore an object of the present invention to provide a method and means for accurately checking the reliability of multi-channel program commanded systems for controlling measure.

Another object is the attainment of the above with relatively simple and economical apparatus.

Another object is an accurate means for checking the reliability of a multi-channel program controlled system for controlling measure requiring relatively few parts additional in the system.

Further objects and advantages of the present invention will be apparent from the following description, reference being had to the accompanying drawings wherein there is shown a block diagram of a preferred embodiment of the invention in connection with a digitally-controlled dual channel position servo such as would be used in directing a tool along X and Y axes.

The digital position control system shown in the drawing responds to digital X and Y commands received from a record such as the punched tape 10, to position along X and Y axes, either separate elements such as tools or indicators, or a single element such as a machine table. The diagram blocks 11 and 12 may be equally representative of separate tools, separate positioning elements of a machine table, or some other measures such as temperature, flow, or other, controlled by the respective X and Y channels. In the example they represent elements for positioning a drill press table. The system includes an X axis channel and a Y axis channel. The X channel includes a tape reader 14 feeding a digital-to-analog converter 16, whose output is normally directed to one input of a comparator 18, where it is compared with a representation of the actual position of the element 11 being positioned along the X axis. The error signal of the comparator is normally amplified by a servo amplifier 22 whose output normally drives a servomotor 24. The mechanical output 26 of the servomotor drives the element 11, and is also coupled to an input of the comparator 18. In like manner, the Y axis channel includes a tape reader 28, a digital-to-analog converter 30, a comparator 32, a servo amplifier 34, a servomotor 36 whose mechanical output 37 is coupled to the element 12 and the comparator 32.

Means in the form of a pair of relays 42 and 44 is provided for rearranging the connections between converters 16 and 30, comparators 18 and 32, and amplifiers 22 and 34. In the normal unoperated condition of relay 42 (that shown in the drawing), normally closed contacts 46 and 48 of the relay connect the outputs of the converters 16 and 30, respectively, to the comparators 18 and 32. At the same time, the normally unoperated relay 44, through normally closed contacts 50 and 52, connects the outputs of comparators 18 and 32, respectively, to the amplifiers 22 and 34. However, when relays 42 and 44 are energized, contacts 46, 48, 50 and 52 open, and normally open contacts 54, 56, 58 and 60 close. Relays 42 and 44 may be energized in response to the closure of a manually operated switch 62, or by energizing current furnished by a tape reader 64 that responds to particular information recorded on the tape which may be referred to as "check cycle 'on' data".

Coupled to be energized concurrently with relays 42 and 44 is a relay 68 and a relay 69. Relay 68 has normally closed contacts 70, 72 which connect the X amplifier 22 to the X servomotor 24, and the Y amplifier 34 to the Y servomotor 36. When relay 68 is operated, contacts 70 and 72 open to disconnect the outputs of the X and Y amplifiers 22 and 34 from their associated motors 24 and 36. Relay 69 has normally open contacts 74 and normally closed contacts 76 for purposes later described.

The respective outputs of amplifiers 22 and 34 are also connected to the operating windings of relays 80 and 82 whose normally closed contacts 84 and 86 are connected in series between a junction 88 and a battery 90. When relays 80 and 82 are unoperated, their closed contacts supply potential from battery 90 to the junction 88. Relays 80 and 82 are unoperated only when the error signals from the amplifiers 22 and 34 are at "null." Junction 88 is also connected to either a tape advance mechanism 94 or the start mechanism of a machine 96, depending on the state of relay 69. When this relay is unoperated, its normally closed contacts 76 connect junction 88 through a line 97 to the tape advance mechanism 94, and when the relay is operated, its normally open contacts 74 are closed to connect the junction 88 to the machine 96 and a null indicator 98 along a path 100.

For illustrative purposes, the machine 96 may be a drill press with a head, which, in response to a start signal received via the path 100, travels from a retracted position toward a table to an end position. The machine may be arranged to generate and send an end of operation signal along a line 102 to the tape advance mechanism 94 in response to the arrival of the drillhead at the end position. Such a signal may be produced with the aid of a limit switch actuated by the drill head at the end of its excursion. The example may be further extended by considering the elements 11 and 12 as positioning elements for guiding the table of the drill press along X and Y axes to a desired commanded coordinate position. In response to appropriate signals, the tape advance mechanism 94 drives a sprocket wheel 105 to advance the tape 10 an incremental distance to index a "block" of information in position to be read simultaneously by the X and Y readers. The tape advance mechanism 94 may be initially actuated by closing a tape start switch 104 to make the first incremental advance. Subsequent advances are made in response to signals on line 97.

The digitized X and Y commands are represented on the tape 10 by holes or absence of holes in information areas of the tape in accordance with any desired digital code. The X and Y commands for a desired coordinate position are stored in each block of a pair of consecutive blocks along the tape 10, the X and Y commands being arranged in normal position in the first block of the pair and in reverse or transposed order in the second block of the pair. For example, as shown in the drawing, a command for a particular coordinate position represented by certain X and Y values is stored in normal position or order in block 1 of the tape 10. The X and Y commands of block 1 are repeated in block 2 with their positions transposed. In addition, block 2, which is the check block, also contains data to energize the reader 64. This data is labeled "check cycle 'on' data" in the drawings.

At the beginning of an operation, relays 42, 44, 68 and 69 will be unoperated (normal position). Operation is started by closing switch 104 to advance the tape 10 to a position indexing block 1 with the X and Y readers 14 and 28. While in this position, the X data is read by the X reader, and the Y data is read by the Y reader. The respective converters translate the digital commands into appropriate form for use in the comparators, thus supplying to the comparators representations of the recorded command data, which are compared in the respective comparators to representations of the actual positions of the elements 11 and 12. The respective comparators will generate error signals to drive their associated servomotors until the comparator outputs reach a null. The servomotors also drive the elements 11 and 12 to positions corresponding to the comparator nulls. The actual position of the system resulting from the reading of block 1 is "stored" in the comparators in terms of the positions of the mechanical outputs 26 and 37 which drive comparators 18 and 32.

Until the null position is reached in the X channel, the error signal will operate relay 80. The same is true of the Y channel and relay 82. However, as soon as the respective channels reach the null positions, relays 80 and 82 will be unoperated. This initiates the check cycle by applying voltage from battery 90, through closed contacts 76, to the tape advance mechanism which will advance the tape one increment to index the check block 2 in position to be read simultaneously by the X and Y readers and also the reader 64. In response to the "check cycle 'on' data" in block 2 of the tape, the reader 64 will generate and transmit an operating signal to relays 42, 44, 68 and 69, thereby to (1) rearrange the connection between converters 16 and 30, comparators 18 and 32, and amplifiers 22 and 34, (2) open the circuits to the servomotors, (3) disconnect junction 88 from the tape advance mechanism, and (4) connect junction 88 to the start circuit of the machine 96. At the same time the X and Y data is read by the X and Y readers. However, since the X and Y commands of block 1 are repeated in block 2 with their positions transposed, the X information will be read by the Y reader 28, and the Y information will be read by the X reader 14.

If, at the end of the check cycle, the comparators are still at a null, it may be concluded that the system is responding correctly to the recorded commands. Because the comparators are at null, the relays 80 and 82 will be unoperated, and contacts 84 and 86 will be closed to apply the voltage from battery 90 through now closed contacts 74 of relay 69 to a null indicator and to the machine 96 to start the machine cycle by causing the drill head to move from its retracted position toward the extended position. In the meantime, the open contacts 76 of relay 69 prevent a new tape advance. However, at the end of the machine cycle, an end-of-operation signal on line 102 activates the tape advance mechanism to move the tape an increment thereby indexing a new block of X and Y command data in position to be read by the X and Y readers 14 and 28. This tape advance moves the "check cycle 'on' data" of check block 2 away from the reader 64, thus releasing relays 42, 49, 68 and 69. The entire operation is repeated for the new data.

If the comparators were not at a null at the end of the check cycle indicating that some error had taken place, the comparators 18 and 32 would have generated error voltages which would operate relays 80 and 82 and open relay contacts 84 and 86, thus preventing the application of voltage from battery 90 to the start mechanism of the machine 96 over closed contacts 74 and line 100. As a result, the equipment remains stalled until the malfunction is corrected.

It should be appreciated that the apparatus includes means for timing the various functions, for example, the system is arranged to read the blocks of tape information only while the tape is stopped and properly indexed with the readers.

Although the invention has been described in connection with automatic operation, it should be understood that the tape advance and indexing may be manually controlled if desired. Also the operation of relays 42, 44, 68 and 69, may be manually controlled by means of the switch 62 which, when operated, applies voltage from a battery to the operating windings of the relays. Likewise, the machine cycle may be manually started by an operator after noting the null indication on the null indicator 98, which may be a visual or an audible signal. In a strictly manual operation, the reader 64 and relay 69 would not be required, and the null indicator 98 could be connected directly to the line 106.

The storage or record media is not confined to punched tape. Other types of record may be employed, such as punched cards, magnetic tape, etc., the readers being of a type compatible with the record media employed. The converters 16 and 30 may be of any suitable type for converting the command data to proper form for use in the comparators employed. The type of converter will depend on the type of comparator. For example, if the comparators are resolvers, the converters should translate the received command data to the proper sine-cosine related voltages for use in the resolver input stator windings. Likewise, the means for applying representations of the actual position of a controlled element need only be appropriate to the components employed. For example, if the comparator is a resolver, the linkage of the mechanical drive between the servo-motor and the positioned element to the rotor of the resolver provides to the resolver a representation of the position of the element being positioned.

Although the illustrated embodiment is a digitally programmed system, the invention may be practiced in connection with other types of programming, for example, the commands may be stored in analog form on magnetic tape, which would be read by appropriate readers and translated, if necessary, by appropriate converters into command representations compatible with the comparators employed.

In the disclosed embodiment, the tape readers are of a type which simultaneously read all the information in a block, as distinguished from serial bit by bit readers. However, bit by bit reading may be employed in connection with storage registers which accumulate the entire command data for a position and submit it to the converters.

What is claimed is:

1. In a two-axis control system comprising first and second null-seeking positioning servomechanisms; each servomechanism having a signal comparator adapted to receive a command signal and a feedback signal and operative to produce an error signal representing any disagreement therebetween, coupling means for applying said command signal to said comparator, and a feedback generator coupled to said comparator and normally responsive to said error signal; means for checking the reliability of one axis of said system comprising first actuateable means for replacing when actuated the coupling means associated with one of said servomechanisms by the coupling means associated with the other of said servomechanisms, second actuateable means for selectively making the feedback generator of said one of said servomechanisms non-responsive to the error signal associated therewith, means for simultaneously actuating said first and second actuateable means, and means responsive to the error signal of said one of said servomechanisms resulting from the simultaneous actuation of said first and second actuateable means.

2. In a two-axis control system comprising first and second null-seeking positioning servomechanisms; each servomechanism having a signal comparator adapted to receive a command signal and a feedback signal and operative to produce an error signal representing any disagreement therebetween, coupling means for applying said command signal to said comparator, and a feedback generator coupled to said comparator and responsive to said error signal; means for checking the reliability of one axis of said system comprising first actuateable means for replacing when actuated the coupling means associated with one of said servomechanisms by the coupling means associated with the other of said servomechanisms, second actuateable means for selectively decoupling when actuated thte error signal of said one of said servomechanisms from the feedback generator associated therewith, means for simultaneously actuating said first and second actuateable means, and means responsive to the error signal of said one of said servomechanisms resulting from the simultaneous actuation of said first and second actuateable means.

3. In a two-axis control system comprising first and second null-seeking positioning servomechanisms; each servomechanism having a signal comparator adapted to receive a command signal and a feedback signal and operative to produce an error signal representing any disagreement therebetween, coupling means for applying said command signal to said comparator, and a feedback generator coupled to said comparator and normally responsive to said error signal; means for simultaneously checking the reliability of both axes of said system comprising first actuateable means for interchanging when actuated the coupling means of one of said servomechanisms with the coupling means of the other of said servomechanisms, second actuateable means for selectively making the feedback generator of said one of said servomechanisms non-responsive to the error signal associated therewith, means for simultaneously actuating said first and second actuateable means, and means responsive to the error signals of said servomechanisms resulting from the simultaneous actuation of said first and second actuateable means.

4. In a two-axis control system comprising first and second null-seeking positioning servomechanisms; each servomechanism having a signal comparator adapted to receive a command signal and a feedback signal and operative to produce an error signal representing any disagreement therebetween, coupling means for applying said command signal to said comparator, and a feedback generator coupled to said comparator and responsive to said error signal; means for simultaneously checking the reliability of both axes of said system comprising first actuateable means for interchanging when actuated the coupling means of one of said servomechanisms with the coupling means of the other of said servomechanisms, second actuateable means for selectively decoupling when actuated the error signals of said servomechanisms from the feedback generators associated therewith, means for simultaneously actuating said first and second actuateable means, and means responsive to the error signals of said servomechanisms resulting from the simultaneous actuation of said first and second actuateable means.

5. In a program controlled system for controlling measure having A and B channels for controlling measures A and B respectively, each channel including means for reading record media having stored command data representing a desired measure, a comparator which compares a representation of the desired measure and a representation of the actual measure and in response to disagreement between desired and actual measures provides an error output indicative of the disagement, coupling means responsive to said reading means for supplying representations of command data to said comparator, and means for supplying representation of said actual measure to said comparator, the combination therewith of means for checking the reliability of said system comprising switch means for interchanging said reading means and said coupling means whereby the A reading means and the A coupling means supply representations of command data to the B comparator and the B reading means and the B coupling means supply representations of command data to the A comparator, and means for feeding a duplicate of an original A and B command to said reading means in reverse order whereby the A reading means reads the B command and the B reading means reads the A command, and means responsive to the relation between the error outputs resulting from the original and duplicate commands.

References Cited by the Examiner
UNITED STATES PATENTS

| 2,340,809 | 2/1944 | Hatton | 235—153 |
| 2,537,770 | 1/1951 | Livingston | 340—174.1 |
| 2,792,545 | 5/1957 | Kamm | 318—467 |
| 2,873,439 | 2/1959 | Lahti et al. | 340—317 |
| 3,002,115 | 9/1961 | Johnson et al. | 340—147 |

NEIL C. READ, *Primary Examiner.*

IRVING L. SRAGOW, EVERETT R. REYNOLDS,
*Examiners.*